United States Patent
Shiokawa et al.

(10) Patent No.: US 12,358,204 B2
(45) Date of Patent: Jul. 15, 2025

(54) METHOD FOR MANUFACTURING LIQUID CONTAINER

(71) Applicant: YOSHINO KOGYOSHO CO., LTD., Tokyo (JP)

(72) Inventors: Mitsuru Shiokawa, Tokyo (JP); Mitsuaki Isahai, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 31 days.

(21) Appl. No.: 18/261,190

(22) PCT Filed: Jan. 6, 2022

(86) PCT No.: PCT/JP2022/000262
§ 371 (c)(1),
(2) Date: Jul. 12, 2023

(87) PCT Pub. No.: WO2022/176423
PCT Pub. Date: Aug. 25, 2022

(65) Prior Publication Data
US 2024/0083092 A1 Mar. 14, 2024

(30) Foreign Application Priority Data
Feb. 18, 2021 (JP) .................................. 2021-024648

(51) Int. Cl.
B29C 49/46 (2006.01)
B29C 49/12 (2006.01)
(Continued)

(52) U.S. Cl.
CPC .............. *B29C 49/46* (2013.01); *B29C 49/12* (2013.01); *B29C 2049/4664* (2013.01);
(Continued)

(58) Field of Classification Search
CPC ......... B29C 49/46; B29C 49/12; B29C 49/62; B29C 2049/4664; B29C 49/1206; B29L 2031/7158
See application file for complete search history.

(56) References Cited

U.S. PATENT DOCUMENTS 11,511,475 B2 * 11/2022 Okuyama ............... B29C 49/46
2021/0039302 A1 2/2021 Hoshino et al.

FOREIGN PATENT DOCUMENTS

JP 2019-119099 A 7/2019
JP 2019-188796 A 10/2019
(Continued)

OTHER PUBLICATIONS

Mar. 8, 2022 International Search Report issued in International Patent Application No. PCT/JP2022/000262.
(Continued)

*Primary Examiner* — Alison L Hindenlang
*Assistant Examiner* — Shibin Liang
(74) *Attorney, Agent, or Firm* — Oliff PLC

(57) ABSTRACT

A liquid-filled container manufacturing method including: the air discharge step of discharging air from an inside of a preform, by supplying a liquid at a level of pressure that does not cause stretching of the preform to the inside of the preform through an intra-tube channel formed between an inner peripheral surface of a spare supply tube extending through a blow nozzle and an outer peripheral surface of a spare supply rod provided radially inward thereof; and the liquid blow molding step of molding the preform into a container with a shape conforming to an inner surface of a mold, by stretching the preform downward using the spare supply rod and supplying a pressurized liquid to the inside of the preform through an intra-nozzle channel formed
(Continued)

between an inner peripheral surface of the blow nozzle and the outer peripheral surface of the spare supply rod.

4 Claims, 11 Drawing Sheets

(51) Int. Cl.
    *B29K 23/00*         (2006.01)
    *B29K 67/00*         (2006.01)
    *B29L 31/00*         (2006.01)

(52) U.S. Cl.
    CPC .... *B29K 2023/12* (2013.01); *B29K 2067/003* (2013.01); *B29L 2031/7158* (2013.01)

(56) References Cited

FOREIGN PATENT DOCUMENTS

| | | | |
|---|---|---|---|
| WO | 2011079917 A1 | 7/2011 | |
| WO | 2019130781 | * 7/2019 | ............. B29C 49/46 |

OTHER PUBLICATIONS

Nov. 13, 2024 Extended Search Report issued in European Patent Application No. 22755749.3.

* cited by examiner

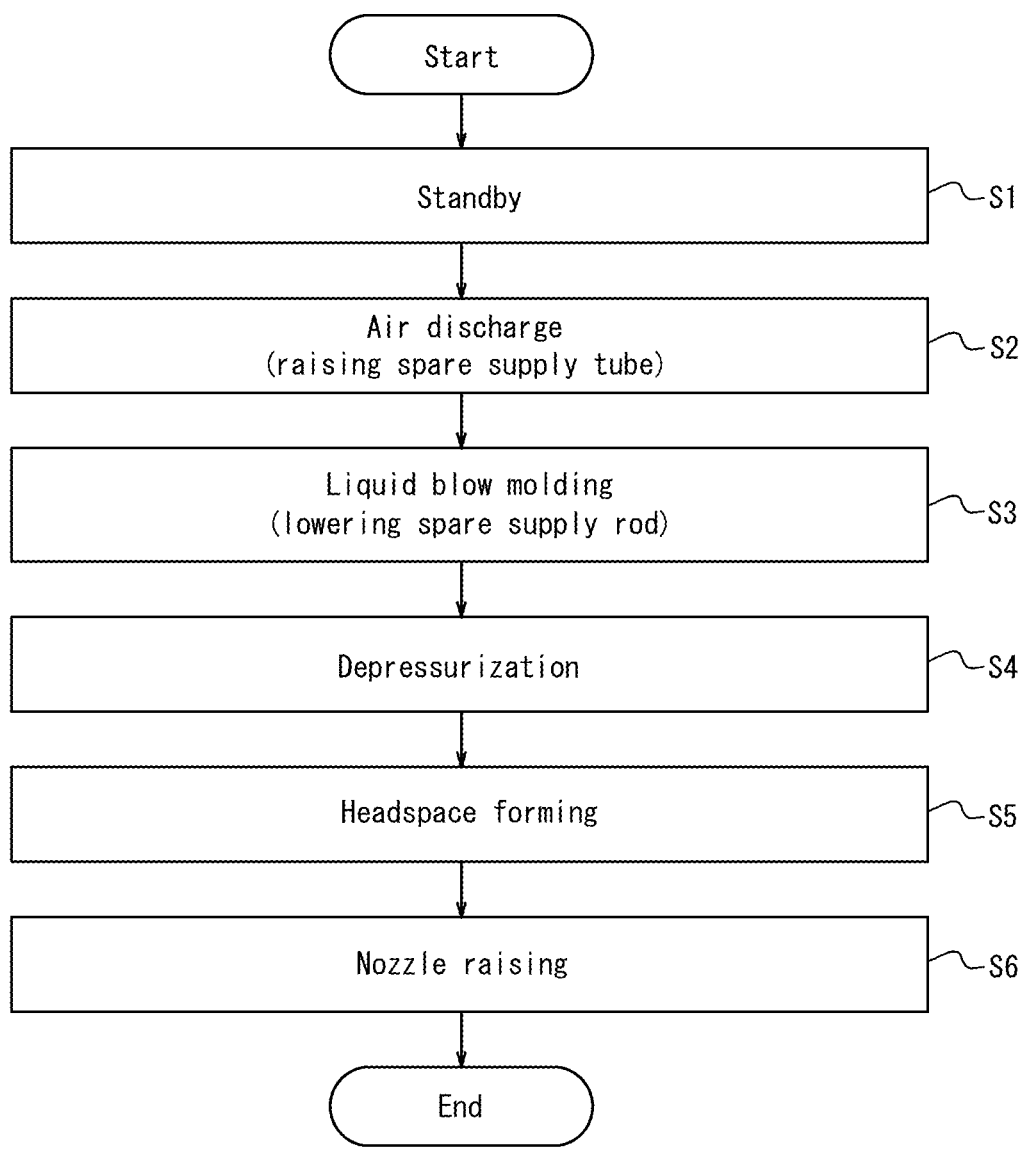

METHOD FOR MANUFACTURING LIQUID CONTAINER

TECHNICAL FIELD

The present disclosure relates to a liquid-filled container manufacturing method for manufacturing, from a preform, a liquid-filled container containing a content liquid.

BACKGROUND

Synthetic resin containers, typical examples of which include polypropylene (PP) bottles and polyethylene terephthalate (PET) bottles, have been used to contain a variety of liquids, such as beverages, cosmetics, pharmaceuticals, detergents, or toiletries including shampoo, as content liquids. Such a container is typically manufactured by blow molding a preform formed of a thermoplastic synthetic resin material as described above.

Known techniques for blow molding a preform into a container include liquid blow molding in which, instead of pressurized air, a pressurized liquid is used as a pressurizing medium to be supplied to the inside of the preform.

There is also a known method for manufacturing a container containing a content liquid, by simultaneously molding the container and filling the container with the content liquid. The content liquid to be contained in the container as a final product is used as a liquid to be supplied to the preform. Such a liquid-filled container manufacturing method omits the step of filling the content liquid to the molded container, thereby allowing low-cost manufacturing of the liquid-filled container.

As a liquid-filled container manufacturing method, as described in Patent Literature (PTL) 1, for example, a method including the air discharge (pre-filling) step of discharging air from the inside of a preform, by supplying a liquid to the inside of the preform through an intra-tube channel formed between an inner peripheral surface of a spare supply tube extending through a blow nozzle and an outer peripheral surface of a spare supply rod provided radially inward thereof, and the liquid blow molding step performed after the air discharge step using the spare supply tube and the spare supply rod as a stretching rod is also known. By discharging air from the preform in the air discharge step before the liquid blow molding step, when the preform is biaxially stretch blow molded by the pressurized liquid supplied from the blow nozzle and the stretching rod in the liquid blow molding step, air can be prevented from being entrained into the liquid, causing bubbles in the preform, and affecting the molding of the container.

CITATION LIST

Patent Literature

PTL 1: JP 2019-119099 A

SUMMARY

Technical Problem

However, according to the method as described in PTL 1, the liquid is supplied from an intra-nozzle channel formed between an inner peripheral surface of the blow nozzle and an outer peripheral surface of the spare supply tube in the liquid blow molding step. Accordingly, for example, in a case in which a container with a small-diameter mouth is to be molded, the time required to mold the container may increase. Furthermore, in a case in which the diameter of the spare supply tube is reduced in order to enlarge the intra-nozzle channel, it causes a concern that the spare supply rod, which is to be reduced in diameter accordingly, is not strong enough.

It would be helpful to provide a liquid-filled container manufacturing method that can reduce the time required to mold the container.

Solution to Problem

A liquid-filled container manufacturing method according to the present disclosure includes:
  the air discharge step of discharging air from an inside of a preform, by supplying a liquid at a level of pressure that does not cause stretching of the preform to the inside of the preform through an intra-tube channel formed between an inner peripheral surface of a spare supply tube extending through a blow nozzle and an outer peripheral surface of a spare supply rod provided radially inward thereof; and
  the liquid blow molding step of molding the preform into a container with a shape conforming to an inner surface of a mold, by stretching the preform downward using the spare supply rod and supplying a pressurized liquid to the inside of the preform through an intra-nozzle channel formed between an inner peripheral surface of the blow nozzle and the outer peripheral surface of the spare supply rod.

In a preferred embodiment of the liquid-filled container manufacturing method configured as above, in the air discharge step, the spare supply tube is gradually moved upward relative to the spare supply rod, while the liquid is supplied to the inside of the preform through the intra-tube channel.

In another preferred embodiment of the liquid-filled container manufacturing method configured as above, the liquid-filled container manufacturing method includes
  the headspace forming step of forming a headspace inside the container, wherein
  in the headspace forming step, the spare supply tube is moved downward relative to the spare supply rod, and subsequently the liquid is discharged from an inside of the container through the intra-tube channel.

Advantageous Effect

According to the present disclosure, a liquid-filled container manufacturing method that can reduce the time required to mold the container is provided.

BRIEF DESCRIPTION OF THE DRAWINGS

In the accompanying drawings.

FIG. 11 is a flowchart illustrating a liquid-filled container manufacturing method according to an embodiment of the present disclosure.

DETAILED DESCRIPTION

In the following, the present disclosure will be illustrated more specifically with reference to the drawings.

Figure 1:
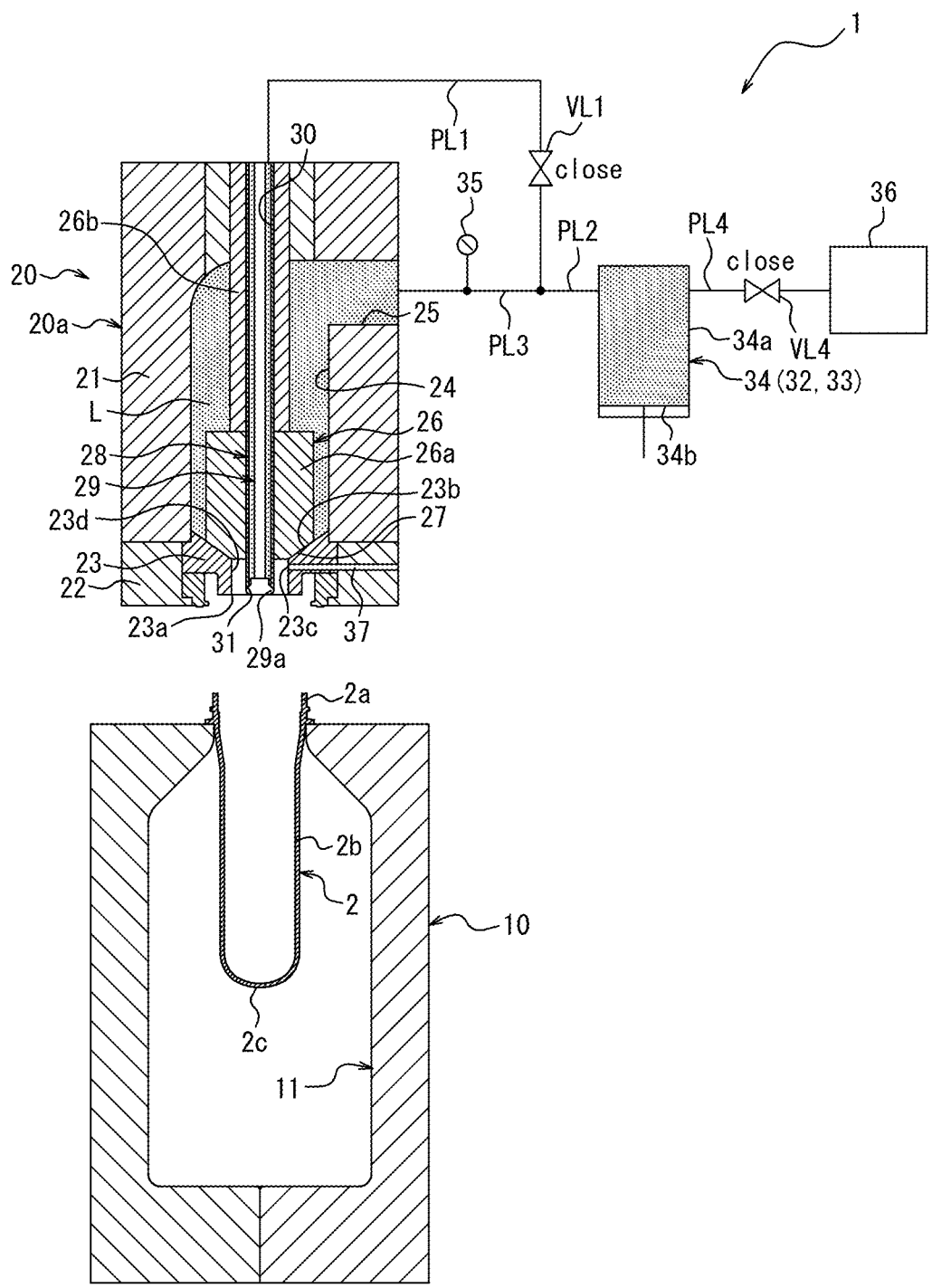
FIG. 1 illustrates an example of a liquid-filled container manufacturing apparatus that is used in a liquid-filled container manufacturing method according to an embodiment of the present disclosure, in a state in which a standby step is performed.

A liquid-filled container manufacturing method according to an embodiment of the present disclosure can be implemented using, for example, a liquid-filled container manufacturing apparatus 1 with the configuration of FIG. 1.

The liquid-filled container manufacturing apparatus 1 of FIG. 1 manufactures a container C (refer to FIG. 10) containing a content liquid from a synthetic resin preform 2. As the liquid (content liquid) L contained in the container C, a variety of liquids L, such as beverages, cosmetics, pharmaceuticals, detergents, or toiletries including shampoo, may be used.

As the preform 2, for example, a preform formed of a thermoplastic resin material, such as polypropylene (PP) and polyethylene terephthalate (PET), in a closed-bottom tubular shape having a cylindrical mouth 2a that serves as an opening end, a cylindrical body 2b that is contiguous with the mouth 2a, and a bottom 2c that closes a lower end of the body 2b, may be used.

Although not illustrated in detail, the mouth 2a is provided, on an outer wall surface thereof, with an engagement protrusion that allows a closing cap (not illustrated) to be attached to the mouth 2a of the molded container C by plugging (undercut engagement). Additionally, a male screw may also be provided on the outer wall surface of the mouth 2a instead of the engagement protrusion, and the closing cap may be attached to the mouth 2a by screw connection.

The liquid-filled container manufacturing apparatus 1 includes a blow-molding mold 10. The mold 10 has a cavity 11, which has a shape corresponding to a final shape, such as a bottle shape, of the container C. The cavity 11 is open upward at an upper surface of the mold 10. The preform 2 is placed in the mold 10, with the body 2b and the bottom 2c being arranged inside the cavity 11 of the mold 10 and with the mouth 2a protruding upward from the mold 10.

The mold 10 may be opened into left and right mold halves, and, by opening the mold 10 into the left and right mold halves after molding the preform 2 into the container C, the container C may be removed from the mold 10.

Above the mold 10, there is provided a nozzle unit 20, which is configured to supply the pressurized liquid L to the inside of the preform 2. The nozzle unit 20 includes a main body block 21.

The main body block 21 is provided, in a lower end thereof, with a support block 22. The support block 22 supports a blow nozzle 23, which is attached to the lower end of the main body block 21. The blow nozzle 23 is formed in a tubular shape having a columnar surface-shaped inner peripheral surface 23d, and a liquid supply port 23a is provided at a lower end portion of the inner peripheral surface 23d. The main body block 21, the support block 22, and the blow nozzle 23 constitute a nozzle unit main body 20a. The nozzle unit main body 20a is movable in a vertical direction relative to the mold 10. When the nozzle unit main body 20a descends to its lowermost stroke end, the nozzle unit main body 20a (or, more concretely, the blow nozzle 23) comes into sealing engagement from above with the mouth 2a of the preform 2 placed in the mold 10.

The nozzle unit main body 20a (or, more concretely, the main body block 21 and the blow nozzle 23) is provided, inside thereof, with a longitudinal channel 24, which terminates at the liquid supply port 23a of the blow nozzle 23. The longitudinal channel 24 extends in the vertical direction. In the present embodiment, a liquid supply passage that terminates at the liquid supply port 23a includes the longitudinal channel 24, a later-described liquid supply port 25, a third liquid pipe PL3, and a second liquid pipe PL2. That is, the end of the liquid supply passage and the end of the longitudinal channel 24 are both situated at the liquid supply port 23a.

The nozzle unit main body 20a (or, more concretely, the main body block 21) is provided with the liquid supply port 25, which communicates to an upper end of the longitudinal channel 24.

The blow nozzle 23 is provided, on an upper surface thereof, with a downwardly conical seal surface 23b. The shape of the seal surface 23b can be changed as appropriate. The seal surface 23b may be configured by the inner peripheral surface 23d of the blow nozzle 23, or by the upper surface and the inner peripheral surface 23d of the blow nozzle 23. Inside the longitudinal channel 24, there is arranged a seal main body 26a, which can be seated against the seal surface 23b. The seal main body 26a is formed in a cylindrical shape having an axis coaxial with the inner peripheral surface 23d of the blow nozzle 23, and a downward conical tapered surface 27 is provided at a lower end of the seal main body 26a. The arrangement and shape of the tapered surface 27 can be changed as appropriate. When the seal main body 26a moves to a closing position, that is, the lowermost stroke end position, it comes into close contact with the seal surface 23b at the tapered surface 27, to thereby close the longitudinal channel 24. On the other hand, when the seal main body 26a moves upward from the closing position, the tapered surface 27 of the seal main body 26a lifts off from the seal surface 23b, to thereby open the longitudinal channel 24.

As illustrated in FIG. 1, the seal main body 26a is coaxially fixed to a lower end of a shaft body 26b, which is provided so as to be movable in the vertical direction relative to the nozzle unit main body 20a, so that the seal main body 26a is movable in the vertical direction inside the longitudinal channel 24. Although the seal main body 26a is formed with a larger diameter than the shaft body 26b, the present disclosure is not limited to this, and it may be formed with the same diameter as the shaft body 26b, for example. Additionally, the seal main body 26a may be formed integrally with the shaft body 26b. The seal main body 26a and the shaft body 26b configure a seal body 26 that opens and closes the longitudinal channel 24 by making advancing and retracting movements relative to the seal surface 23b.

The nozzle unit 20 includes a cylindrical spare supply tube 28, which is arranged inside the seal body 26 so as to extend along the axis of the seal body 26 and which is movable in the vertical direction relative to the seal body 26, and a spare supply rod 29, which is arranged radially inward of the spare supply tube 28 so as to extend along the axis of the seal body 26 and which is movable in the vertical direction relative to the seal body 26. The spare supply tube 28 and the spare supply rod 29 are driven individually or in corporation with each other by a driving source that is not illustrated. The spare supply tube 28 and the spare supply rod 29 can each be formed of steel, for example.

The spare supply rod 29 is provided, at a lower end thereof, with a large-diameter portion 29a, and an upper surface of the large-diameter portion 29a abuts against a lower end surface of the spare supply tube 28, to thereby close a spare supply port 31 formed at a lower end of the spare supply tube 28. Inside the spare supply tube 28, there is provided an intra-tube channel 30 formed between an inner peripheral surface of the spare supply tube 28 and an outer peripheral surface of the spare supply rod 29. A lower end of the intra-tube channel 30 forms a spare supply port 31, and the intra-tube channel 30 is closed when the spare supply port 31 is closed.

The spare supply rod 29 is used as a stretching rod that moves downward so as to stretch the preform 2 downward (in an axial direction).

The spare supply port 31 is connected to one end of a first liquid pipe PL1 via the intra-tube channel 30. A first liquid pipe valve VL1 is provided in the first liquid pipe PL1, and the first liquid pipe valve VL1 can open and close the first liquid pipe PL1. The first liquid pipe valve VL1 is configured by a solenoid valve and is controlled to open and close by a control means that is not illustrated. Another end of the first liquid pipe PL1 is connected to a pressurized liquid supply source 33 via the second liquid pipe PL2. Thus, in the present embodiment, the spare supply port 31 is connected to the pressurized liquid supply source 33 by a spare supply path formed by the intra-tube channel 30, the first liquid pipe PL1, and the second liquid pipe PL2.

In the present embodiment, the pressurized liquid supply source 33 and a later-described liquid drawing source 32 are configured by a common pump 34 that is operable in both a pressurizing direction (positive direction) and a drawing direction (opposite direction). Although the pump 34 is configured as a plunger pump with a cylinder 34a and a piston (plunger) 34b in the present embodiment, other types of pumps may also be used.

The other end of the first liquid pipe PL1 is also connected to the liquid supply port 25 via the third liquid pipe PL3. A third liquid pipe pressure gauge 35 is provided in the third liquid pipe PL3, and measurement data of the third liquid pipe pressure gauge 35 is input to the aforementioned control means. Thus, the pressurized liquid supply source 33 is connected to the liquid supply passage that terminates at the liquid supply port 23a and that is formed by the longitudinal channel 24, the liquid supply port 25, the third liquid pipe PL3, and the second liquid pipe PL2.

In the present embodiment, the pump 34 is shared in the spare supply path and the liquid supply passage, but they may be configured to use separate pumps 34. In this case, the spare supply path and the liquid supply passage are preferably configured to be independent of each other. Additionally, in the present embodiment, the pressurized liquid supply source 33 and the liquid drawing source 32 are configured by the same pump 34, but the pressurized liquid supply source 33 and the liquid drawing source 32 may be configured by separate pumps.

The pressurized liquid supply source 33 is connected to a tank 36 via a fourth liquid pipe PL4. The tank 36 can be configured to contain the liquid L and to heat the liquid L to a predetermined temperature and maintain it at the temperature. A fourth liquid pipe valve VL4 is provided in the fourth liquid pipe PL4, and the fourth liquid pipe valve VL4 can open and close the fourth liquid pipe PL4. The fourth liquid pipe valve VL4 is configured by a solenoid valve and is controlled to open and close by the aforementioned control means.

A gas discharge port 23c is provided in part of the blow nozzle 23 that is located downstream from the seal surface 23b. In the present embodiment, the gas discharge port 23c is provided on an inner peripheral surface 23d of the blow nozzle 23, but the gas discharge port 23c may be provided on a portion other than the inner peripheral surface 23d of the blow nozzle 23 (for example, on a lower end surface of the blow nozzle 23). A gas discharge passage 37 is provided inside the blow nozzle 23 and the support block 22, and one end of the gas discharge passage 37 terminates at the gas discharge port 23c.

In the present embodiment, the gas discharge passage 37 can be switched between three states: a drawing state in which the gas and the liquid L are drawn from the gas discharge passage 37 toward a non-illustrated drawing source connected to another end of the gas discharge passage 37; an exposed-to-atmosphere state in which the other end of the gas discharge passage 37 is exposed to the atmosphere; and a pressurizing state in which a pressurized gas is supplied to the gas discharge passage 37 from a non-illustrated pressurized gas supply source connected to the other end of the gas discharge passage 37.

Figure 2:
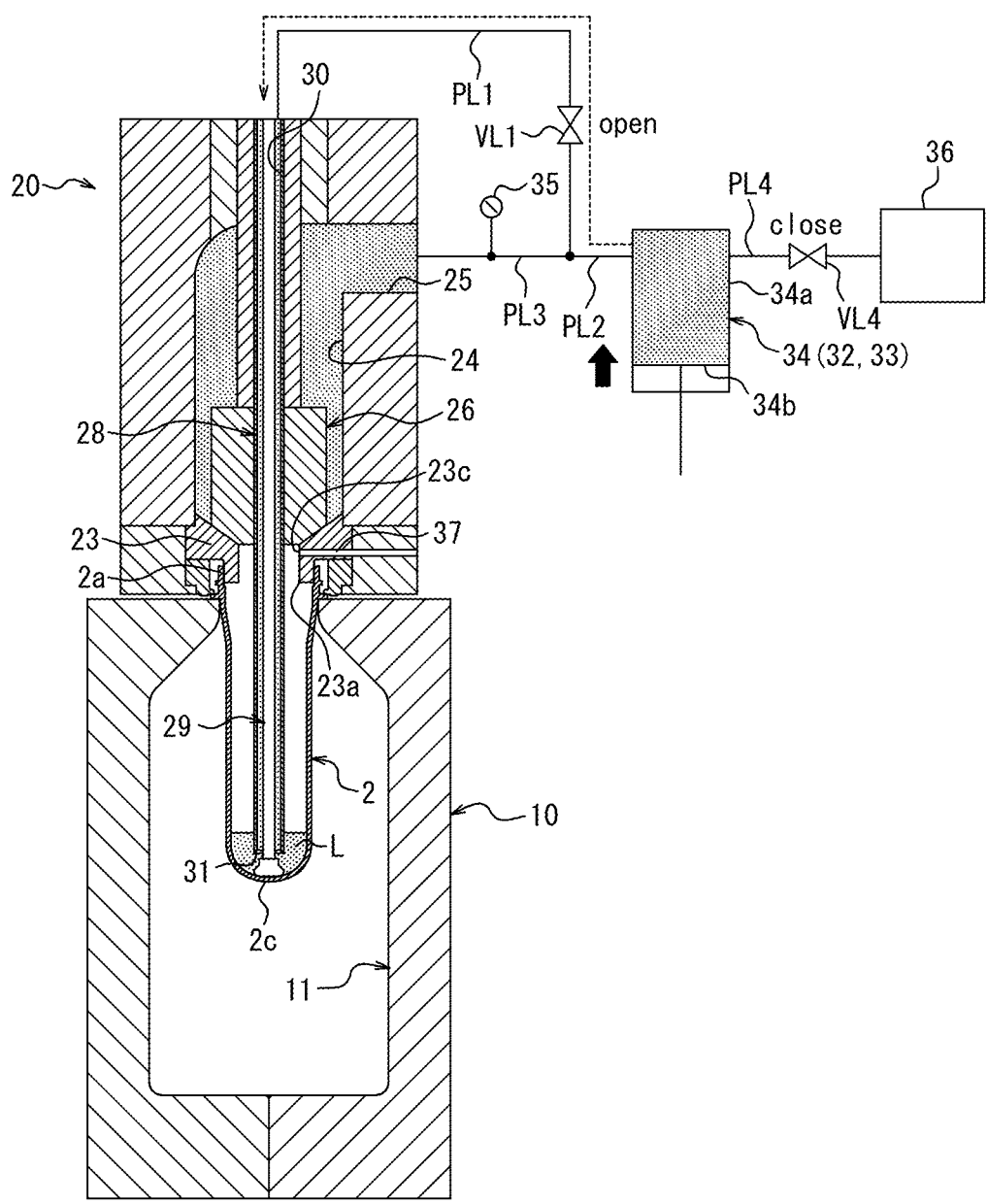
FIG. 2 illustrates the liquid-filled container manufacturing apparatus at the beginning of an air discharge step.
Figure 3:
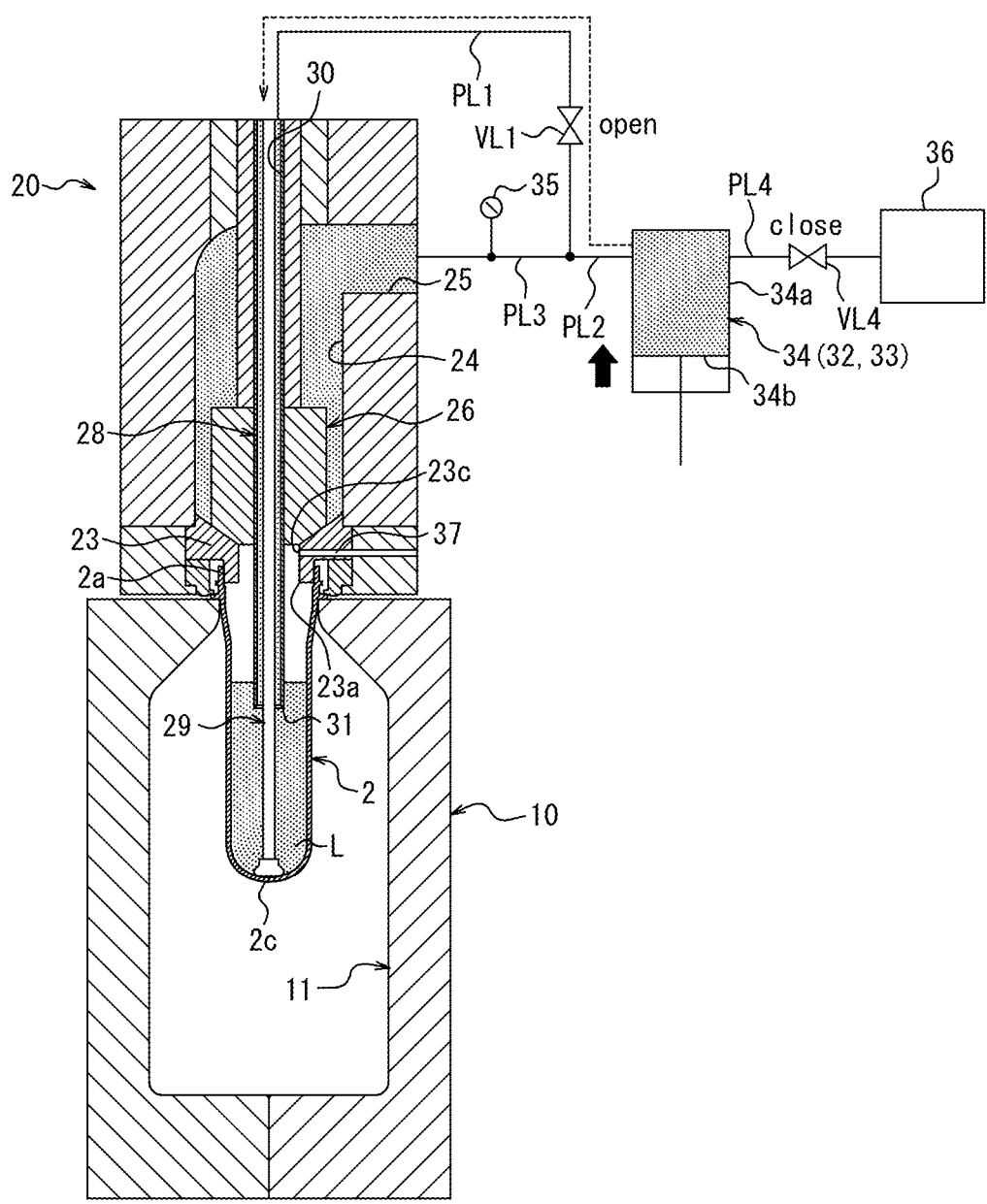
FIG. 3 illustrates the liquid-filled container manufacturing apparatus in the middle of the air discharge step.
Figure 4:
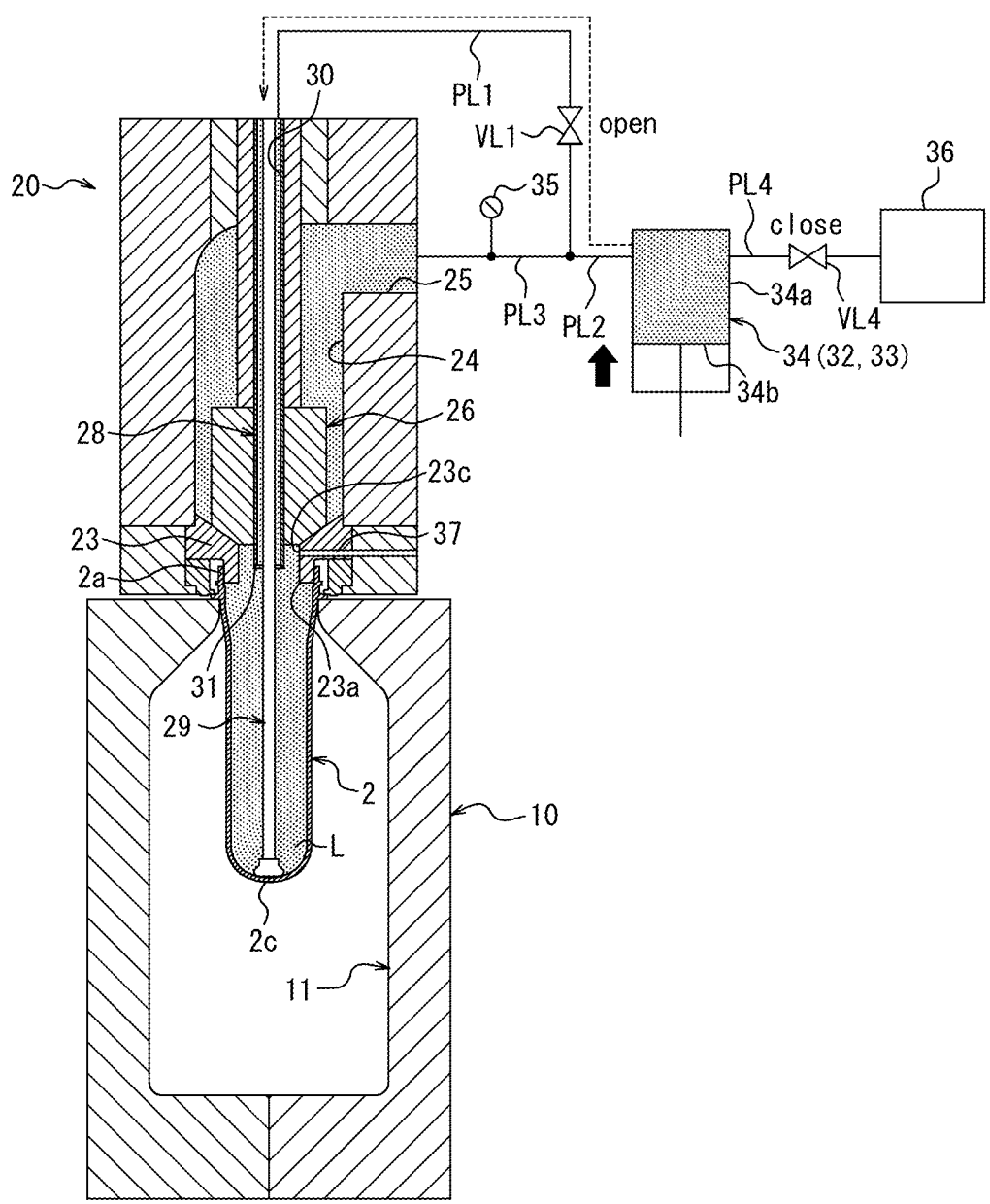
FIG. 4 illustrates the liquid-filled container manufacturing apparatus at the completion of the air discharge step.

As illustrated in FIG. 2 to FIG. 4, in a state in which the blow nozzle 23 is in sealing engagement with the mouth 2a of the preform 2 placed in the mold 10 and in which the seal body 26 closes the longitudinal channel 24, the spare supply port 31 of the spare supply tube 28 is open at the bottom 2c of the preform 2, and the pump 34 (pressurized liquid supply source 33) is operated in the pressurizing direction (refer to the bold arrows in FIG. 2 to FIG. 4), so that the liquid L can be supplied from the pressurized liquid supply source 33 to the inside of the preform 2 via the second liquid pipe PL2, the first liquid pipe PL1, the intra-tube channel 30, and the spare supply port 31 (refer to the dashed arrows or the like in FIG. 2 to FIG. 4). At this time, the fourth liquid pipe valve VL4 is closed, the first liquid pipe valve VL1 is opened, and the gas discharge passage 37 is in the exposed-to-atmosphere state. By bringing the gas discharge passage 37 into the exposed-to-atmosphere state, air is discharged from the inside of the preform 2 to the atmosphere via the gas discharge passage 37 as the liquid L is supplied to the inside of the preform 2. To discharge air, the gas discharge passage 37 may also be configured to be brought into the drawing state, instead of being configured to be brought into the exposed-to-atmosphere state.

Figure 5:
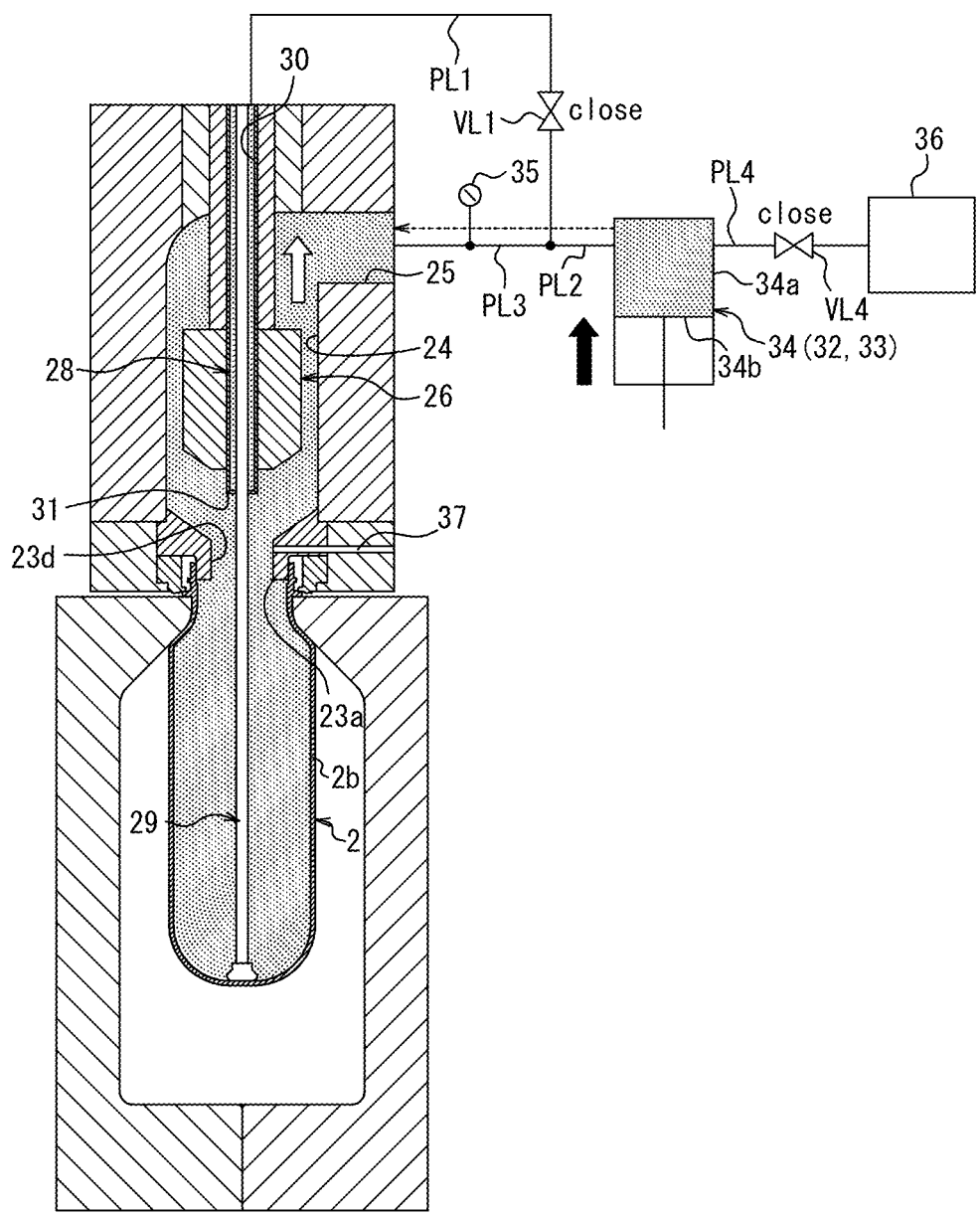
FIG. 5 illustrates the liquid-filled container manufacturing apparatus at the beginning of a liquid blow molding step.
Figure 6:
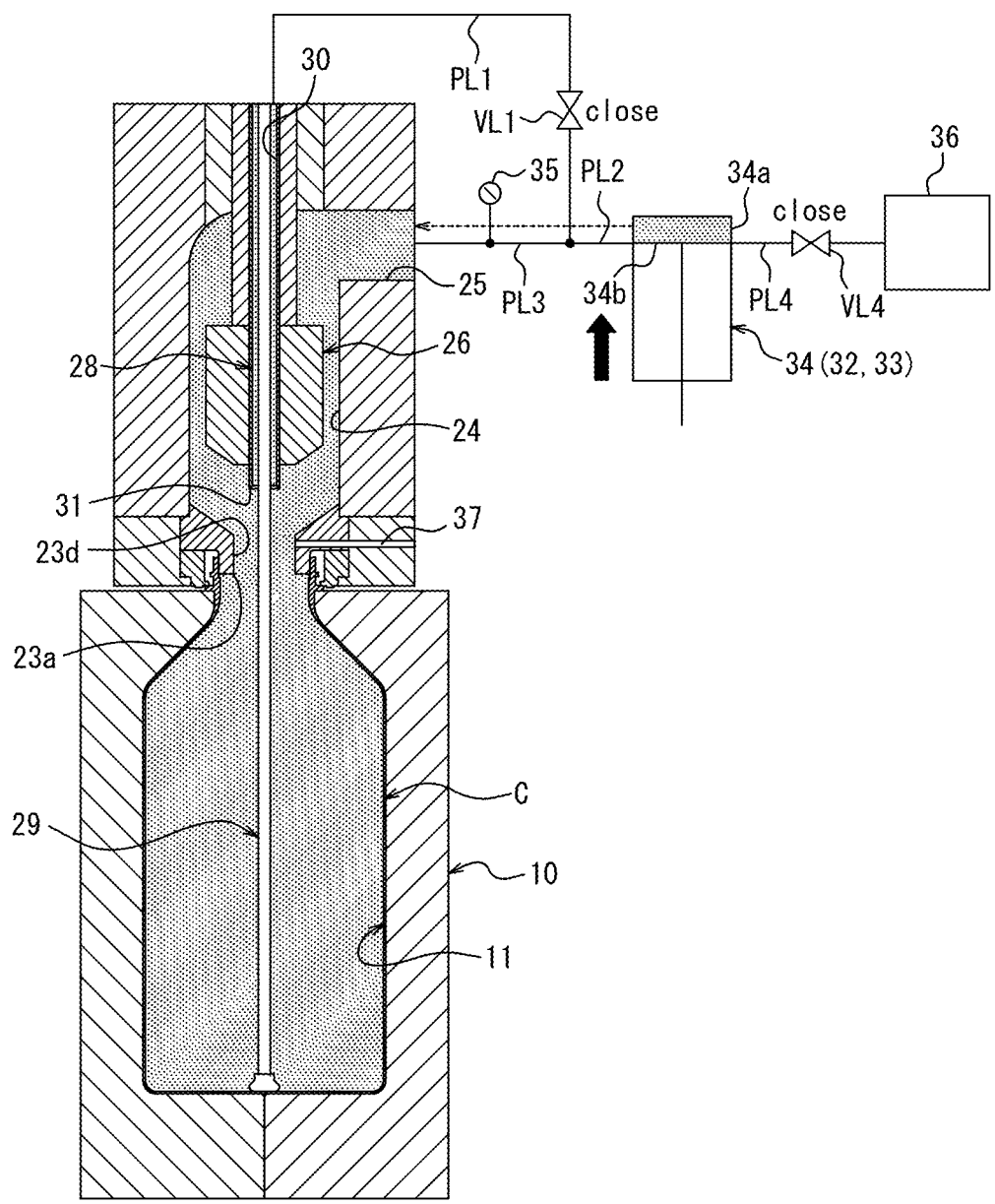
FIG. 6 illustrates the liquid-filled container manufacturing apparatus at the completion of the liquid blow molding step.

As illustrated in FIG. 5 and FIG. 6, from the state in which the blow nozzle 23 is in sealing engagement with the mouth 2a of the preform 2 placed in the mold 10 and in which the seal body 26 closes the longitudinal channel 24, the seal body 26 is caused to make a retracting movement so as to open the longitudinal channel 24, and the pump 34 (pressurized liquid supply source 33) is operated in the pressurizing direction (refer to the bold arrows in FIG. 5 and FIG. 6), so that the pressurized liquid L can be supplied to the inside of preform 2 via the second liquid pipe PL2, the third liquid pipe PL3, the liquid supply port 25, and the longitudinal channel 24 (refer to the dashed arrows or the like in FIG. 5 and FIG. 6). At this time, the fourth liquid pipe valve VL4 is closed, the first liquid pipe valve VL1 is closed, and the gas discharge passage 37 is in a closed state. By thus supplying the pressurized liquid L and axially extending the preform 2 by lowering the spare supply rod 29, the preform 2 can be molded into the container C with a shape conforming to the inner surface of the cavity 11 of the mold 10.

Figure 7:
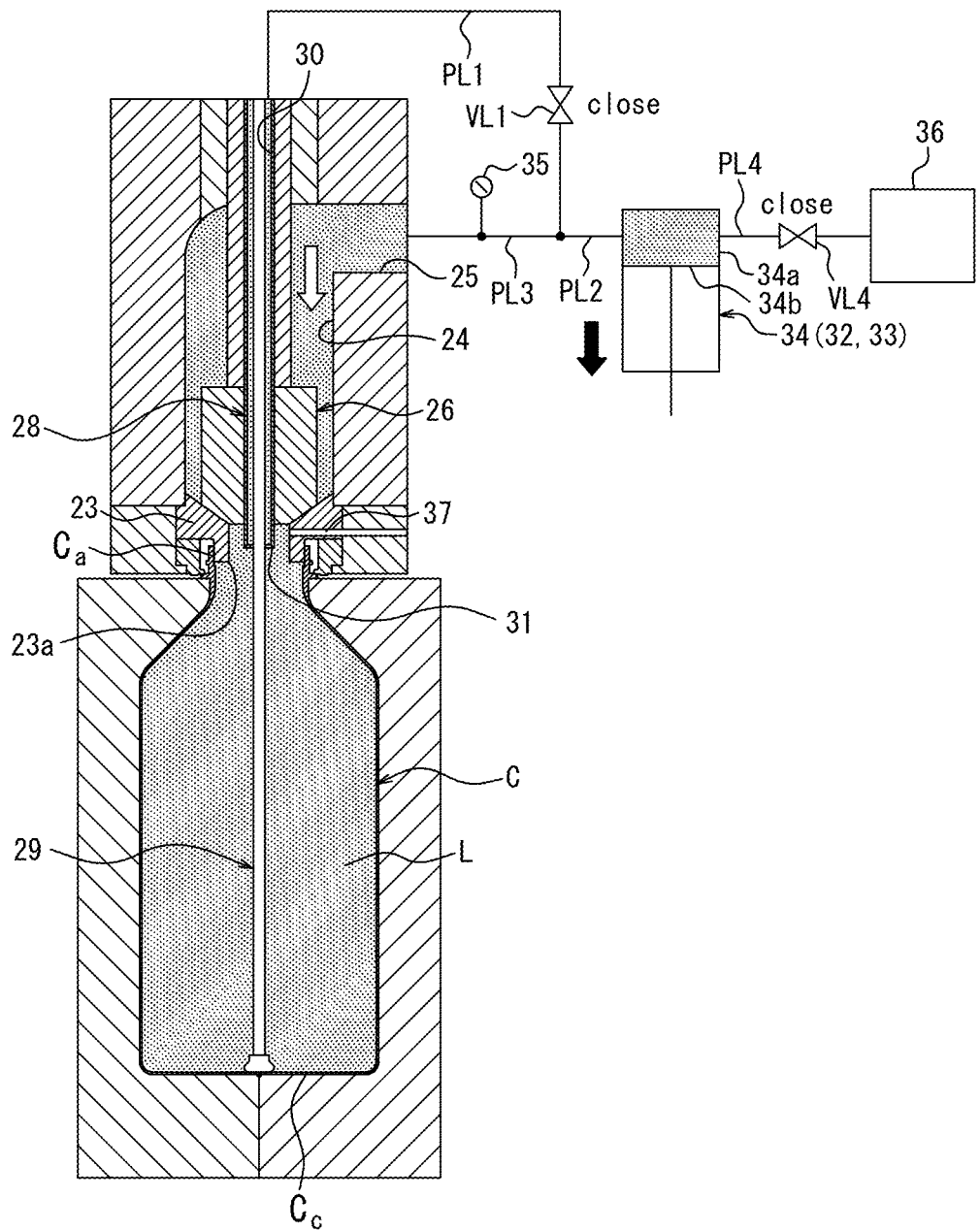
FIG. 7 illustrates the liquid-filled container manufacturing apparatus when a seal body is closed from the state of FIG. 6.

From the state in which the container C has been molded and in which the seal body 26 opens the longitudinal channel 24, the pump 34 (pressurized liquid supply source 33) is operated in the drawing direction (refer to the bold arrow in FIG. 7), while the seal body 26 is caused to make an advancing movement (refer to the white arrow in FIG. 7) until the longitudinal channel 24 is closed by the seal body 26 as illustrated in FIG. 7, so that the liquid L inside the container C is discharged from the liquid supply port 23a toward the pressurized liquid supply source 33, and a high-pressure state inside the container C and inside the liquid supply passage can be quickly eliminated. During this depressurization of the inside of container C and the inside of the liquid supply passage, the fourth liquid pipe valve VL4 is closed, and the first liquid pipe valve VL1 is closed. Additionally, at this time, the first liquid pipe valve VL1 may be left open so that the liquid L can also be discharged from the spare supply port 31. The gas discharge passage 37 remains in the closed state until such depressurization is completed, and the entry of the liquid L into the gas discharge passage 37 is prevented.

Figure 8:
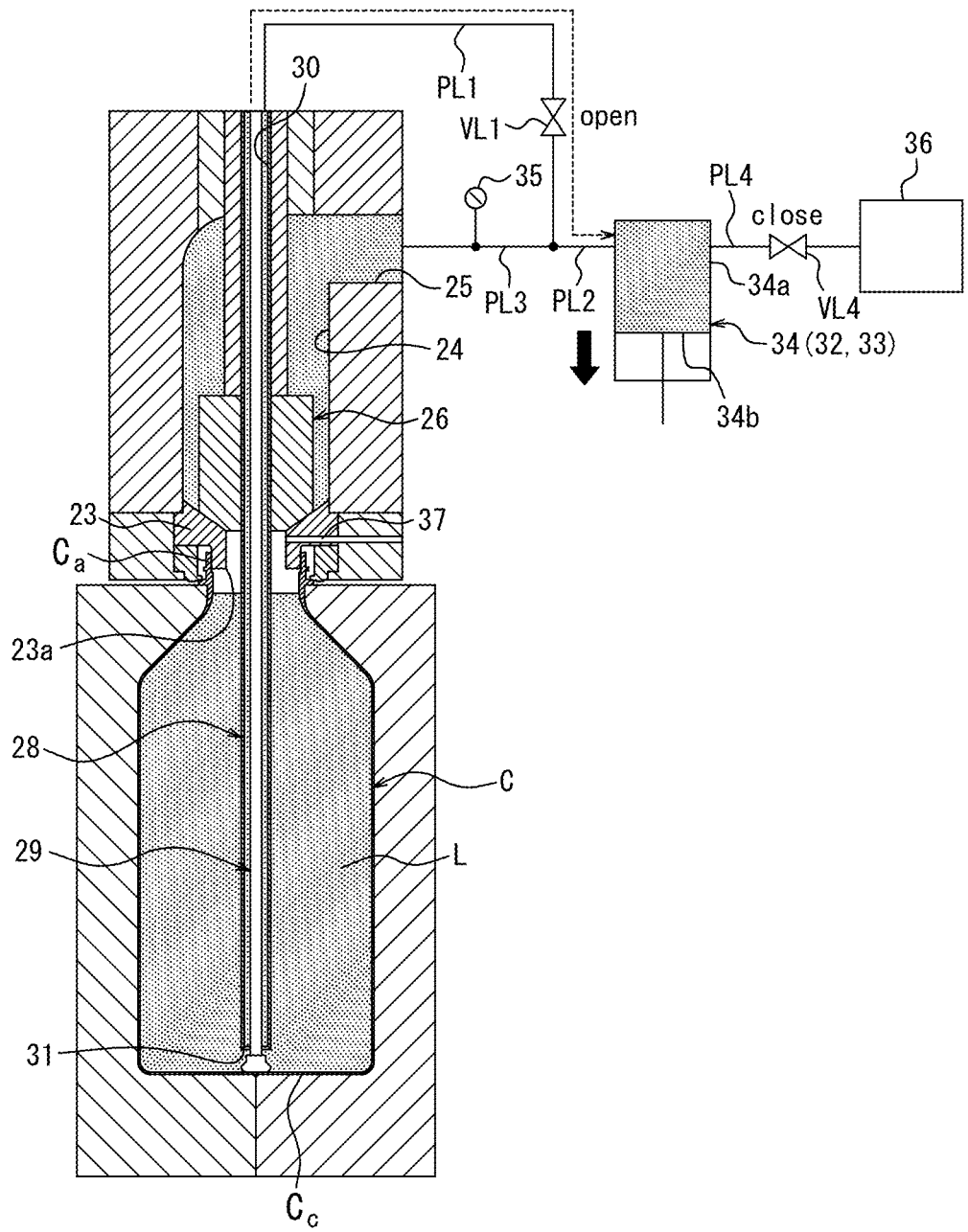
FIG. 8 illustrates the liquid-filled container manufacturing apparatus in a state in which a headspace forming step is performed.

As illustrated in FIG. 8, in a state in which the blow nozzle 23 is in sealing engagement with a mouth Ca of the container C and the seal body 26 closes the longitudinal channel 24 and in which the spare supply port 31 of the spare supply tube 28 is open at the bottom 2c of the preform 2, the pump 34 (liquid drawing source 32) is operated in the drawing direction (refer to the bold arrow in FIG. 8), so that the liquid L inside the container C can be discharged from the spare supply port 31 toward the liquid drawing source 32 (refer to the dashed arrow or the like in FIG. 8). At this time, the fourth liquid pipe valve VL4 is closed, and the first liquid pipe valve VL1 is opened. Furthermore, by bringing the gas discharge passage 37 into the pressurizing state and supplying a pressurized gas (pressurizing gas) from the gas discharge port 23c to the inside of the container C, the discharge of the liquid L through the spare supply port 31 can be accelerated or assisted, and the time required to form a headspace H can be reduced. Such an assist by the pressurized gas is effective particularly when the liquid L as the content liquid has a high viscosity.

Operations of the nozzle unit main body 20a, the seal body 26, the spare supply tube 28, the spare supply rod 29, the pump 34 (plunger 34b), the first liquid pipe valve VL1, the fourth liquid pipe valve VL4, or the like are subject to integrated control by the aforementioned control apparatus that is not illustrated.

Now, a method (liquid-filled container manufacturing method according to the present embodiment) for manufacturing, from the synthetic resin preform 2, the liquid-filled container C with a predetermined shape that contains the liquid (content liquid) L using the liquid-filled container manufacturing apparatus 1 with the above configuration will be described.

As illustrated in FIG. 11, in the present embodiment, a standby step S1, an air discharge step S2, a liquid blow molding step S3, a headspace forming step S4, and a nozzle raising step S5 are performed in this order.

First, the standby step S1 is performed. In the standby step S1, as illustrated in FIG. 1, the nozzle unit 20 is at a position above and away from the mold 10, the seal body 26 closes the longitudinal channel 24, and the spare supply port 31 of the spare supply tube 28 is closed. The gas discharge passage 37 is in the drawing state. With the gas discharge passage 37 being in the drawing state, the liquid L remaining in part of the blow nozzle 23 that is located below the seal surface 23b can be prevented from dripping.

In the standby step S1, the preform 2 that has been heated in advance to a predetermined temperature (e.g., 80° C. to 150° C.) around which stretchability is achieved using a heating means (not illustrated), such as a heater, is placed in the mold 10, and the mold 10 is closed At this time, the mouth 2a of the preform 2 is open, and so the preform 2 is filled with air inside.

Next, the air discharge step S2 is performed in the present embodiment. In the air discharge step S2, as illustrated in FIG. 2, the nozzle unit 20 is lowered so as to engage the blow nozzle 23 with the mouth 2a of the preform 2, the gas discharge passage 37 is brought into the exposed-to-atmosphere state, and the spare supply tube 28 and the spare supply rod 29 are lowered while the longitudinal channel 24 remains closed by the seal body 26, so that the spare supply port 31 is open at the bottom 2c of the preform 2. Then, from this state, the plunger 34b is operated in the pressurizing direction, so as to supply the liquid L to the inside of the preform 2 through the spare supply port 31 via the intra-tube channel 30, thereby discharging air inside the preform 2 to the atmosphere (outside) through the gas discharge passage 37. That is, by supplying the liquid L to the inside of the preform 2, a majority of the air filled inside the preform 2 is pushed out by the liquid L and discharged to the outside. The spare supply port 31 is opened, specifically as a result of the spare supply tube 28 being moved (raised) upward relative to the spare supply rod 29, in a state in which the lower end of the spare supply rod 29 abuts or is situated close to the bottom 2c. The operating speed of the plunger 34b in the air discharge step S2 is set so that the pressure inside the preform 2 is at a level that does not cause stretching (expansion) of the preform 2.

As illustrated in FIG. 2 to FIG. 4, in the air discharge step S2, the spare supply tube 28 is gradually moved upward relative to the spare supply rod 29, while the liquid L is supplied to the inside of the preform 2 through the intra-tube channel 30. By thus raising the spare supply tube 28 before starting the liquid blow molding step S3, the time required to mold the preform 2 into the container C can be reduced accordingly.

When raising the spare supply tube 28, it is preferable to control the raising speed of the spare supply tube 28 so that the lower end of the spare supply tube 28 continues to be positioned within the liquid. This can prevent air inside the preform 2 from being entrained into the liquid L supplied to the inside of the preform 2 and causing bubbling. Preventing bubbling in turn prevents bubbles from affecting the molding of the container C in the liquid blow molding step S3, and it also allows for stable formation of the headspace H of a desired size in the headspace forming step S4.

When air has been discharged from the inside of preform 2, the first liquid pipe valve VL1 is closed, and the gas discharge passage 37 is closed. The first liquid pipe valve VL1 may be left open.

As described above, in the air discharge step S2, instead of supplying the liquid L by opening the longitudinal channel 24 by the seal body 26, the liquid L is supplied from the spare supply port 31 of the spare supply tube 28 extending through the blow nozzle 23. This can prevent air inside the preform 2 from being entrained into the liquid L supplied to the inside of the preform 2 and causing bubbling. This can also prevent entry of the liquid L into the gas discharge port 23c provided on the inner peripheral surface 23d of the blow nozzle 23, thus allowing air to be smoothly discharged from the inside of the preform 2 through the gas discharge passage 37.

When the air discharge step S2 is completed, the liquid blow molding step S3 is performed after that. As illustrated in FIG. 5 and FIG. 6, in the liquid blow molding step S3, in the state in which the blow nozzle 23 is engaged with the mouth 2a of the preform 2, the longitudinal channel 24 is opened, by causing the seal body 26, together with the spare supply tube 28, to make a retracting movement, and the liquid L pressurized by the pressurized liquid supply source 33 is supplied to the inside of the preform 2 through an intra-nozzle channel formed between the inner peripheral surface 23d of the blow nozzle 23 and the outer peripheral surface of the spare supply rod 29, so that the preform 2 is molded into the container C with a predetermined shape conforming to the inner surface of the cavity 11 of the mold 10.

Furthermore, at this time, axial stretching is performed by the spare supply rod 29 so as to stretch the preform 2 downward. The axial stretching is performed by pushing the bottom 2C of the preform 2 downward by the lower end of the spare supply rod 29. By supplying the pressurized liquid L to the inside of the preform 2 after or during the axial stretching, it is possible to perform biaxial stretch blow molding in which the preform 2 is blow molded while being axially stretched by the rod, thereby allowing the preform 2 to be molded into the container C with the predetermined shape with higher accuracy.

In the liquid blow molding step S3 according to the present embodiment, because the liquid L is supplied through the intra-nozzle channel formed between the inner peripheral surface 23d of the blow nozzle 23 and the outer peripheral surface of the spare supply rod 29 as described above, the cross-sectional area of the intra-nozzle channel is large, and the time required to mold the container C can be reduced. That is, in a case in which biaxial stretch-blow molding is performed using the spare supply rod 29 and the spare supply tube 28 as a stretching rod, with the spare supply port 31 being closed, an intra-nozzle channel is formed between the inner peripheral surface 23d of the blow nozzle 23 and an outer peripheral surface of the spare supply tube 28. In contrast, as in the present embodiment, in a case in which biaxial stretch-blow molding is performed using only the spare supply rod 29 as a stretch rod, with the spare supply tube 28 being raised so that its lower end is positioned above the inner peripheral surface 23d of the blow nozzle 23, the intra-nozzle channel is formed between the inner peripheral surface 23d of the blow nozzle 23 and the outer peripheral surface of the spare supply rod 29, which has a smaller diameter than the outer peripheral surface of the spare supply tube 28, and therefore the cross-sectional area of the intra-nozzle channel is larger.

The liquid blow molding step S3 is performed in a state in which the majority of the air inside the preform 2 has been discharged to the outside by the air discharge step S2. Accordingly, when the pressurized liquid L is supplied to the inside of the preform 2, the liquid L is not entrained with air, and air entrapment into the liquid L inside the container C is prevented When the liquid blow molding step S3 is completed, the depressurization step S4 is performed after that. As illustrated in FIG. 7, in the depressurization step S4, the pressure inside the container C is reduced, by operating the liquid drawing source 32 (i.e., operating the pump 34 in the drawing direction) from the state where the longitudinal channel 24 is opened by the seal body 26, and the longitudinal channel 24 is closed by the seal body 26.

Although the depressurization step S4 is performed so as to eliminate a high-pressure state inside the container C, the present disclosure is not limited to this. It is sufficient to perform the depressurization step S4 so as to reduce the pressure inside the container C at least at the time of molding the container (i.e., at the completion of the liquid blow molding step S3). In the depressurization step S4, the gas discharge passage 37 remains in the closed state.

By reducing the pressure inside the container C by the depressurization step S4, the total amount of the liquid L to be discharged from the inside of the container C in the subsequent headspace forming step S5 can be reduced, and the efficiency in forming the headspace H can be improved. Furthermore, a pressurized gas can be smoothly introduced into the inside of the container C in the headspace forming step S5, and the efficiency of forming the headspace H can also be improved in this respect.

Although FIG. 4 to FIG. 7 illustrate a state in which the lower end of the spare supply tube 28 is in the original position of FIG. 1 relative to the seal body 26, the present disclosure is not limited to this. The lower end of the spare supply tube 28 does not need to be in the original position in the states illustrated in FIG. 4 to FIG. 7, and it may be positioned above or below the height. Furthermore, the lower end of the spare supply tube 28 does not need not be situated at the height illustrated in FIG. 1 in the original position, and it may be positioned above or below the height.

When the depressurization step S4 is completed, the headspace forming step S5 is performed after that. As illustrated in FIG. 8, in the headspace forming step S5 according to the present embodiment, the spare supply tube 28 is moved downward relative to the spare supply rod 29 so that the spare supply port 31 is positioned at a bottom Cc of the container C. Then, the first liquid pipe valve VL1 is opened, and the liquid drawing source 32 is operated (that is, the pump 34 is operated in the drawing direction), so as to form the headspace H (refer to FIG. 10) of a desired size inside the container C by suck-back designed to discharge the liquid L from the inside of the container C through the spare supply port 31 and the intra-tube channel 30. In the present embodiment, the suck-back is performed in a state in which the spare supply port 31 is positioned at the bottom Cc of the container C. This prevents air entrapment into the spare supply path and the liquid supply passage, and the molding of a container C is not affected by air entrapment from the next time onward. It is, however, also possible to draw out the liquid L from the spare supply port 31 in a state in which the spare supply port 31 is positioned above the bottom Cc of the container C. Even in this case, by drawing the liquid L out of liquid through the spare supply port 31 positioned below the liquid supply port 23a, air entrapment into the liquid supply passage can be better prevented, compared with a case in which the liquid L is drawn out through the liquid supply port 23a (i.e., through the longitudinal channel 24 by opening the seal body 26).

In the present embodiment, the pump 34 is assisted by a pressurized gas, in order to reduce the time required for the suck-back through the spare supply port 31 by operating the pump 34 in the drawing direction. That is, in the headspace forming step S5, the gas discharge passage 37 is switched from the closed state to the pressurizing state. Either the operation of the pump 34 in the drawing direction or the switching of the gas discharge passage 37 to the pressurizing state may be performed first, or they can be performed simultaneously. The assist by the pressurized gas is effective particularly when the liquid L has a high viscosity. Depending on the viscosity of the liquid L, the assist by the pressurized gas may not be necessary.

Figure 9:
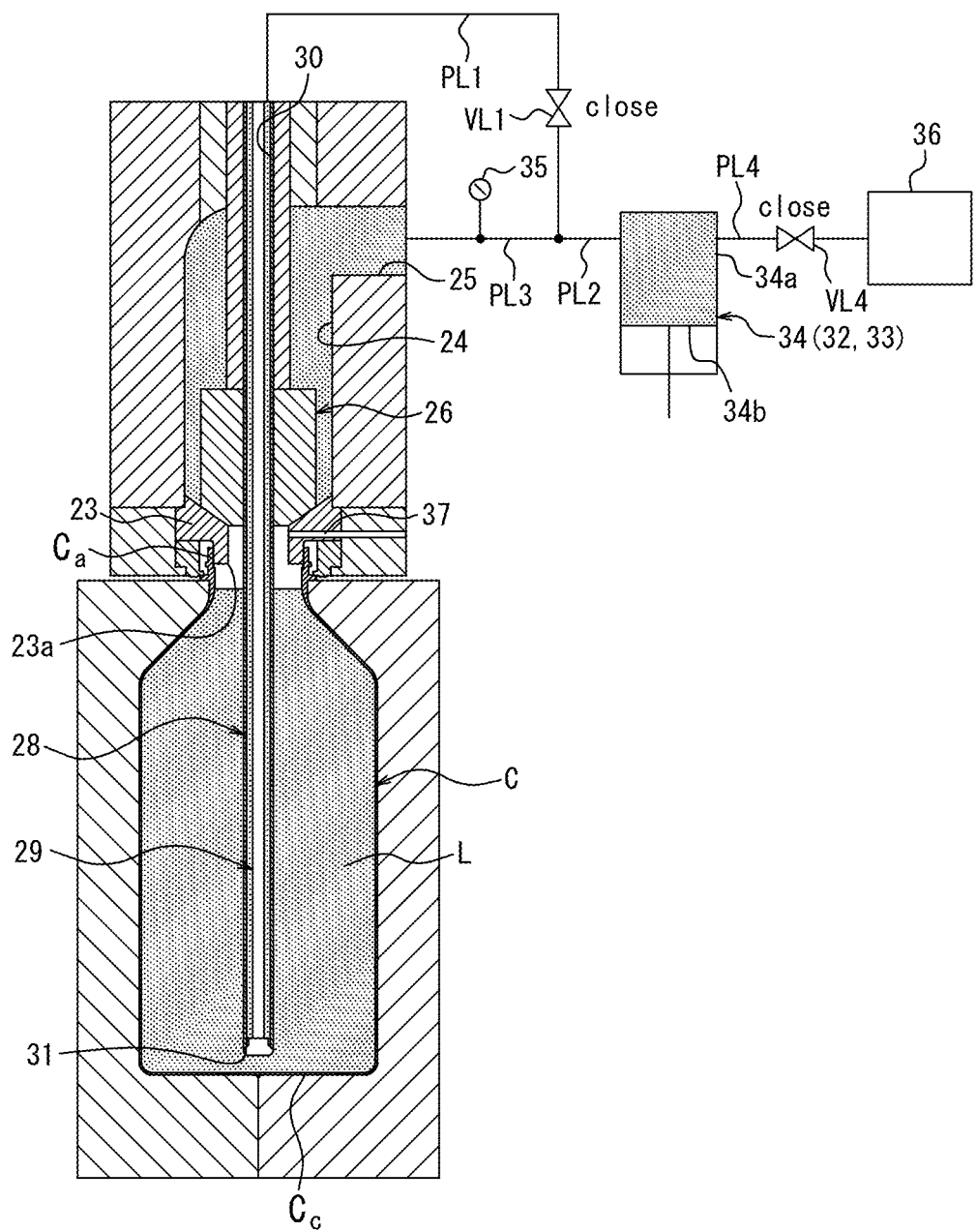
FIG. 9 illustrates the liquid-filled container manufacturing apparatus when a spare supply rod is raised and a spare supply port is closed from the state of FIG. 8.

The headspace H is formed not only by the suck-back, but also by withdrawing the spare supply rod 29 and the spare supply tube 28 from the liquid L inside the container C. In the present embodiment, as illustrated in FIG. 9, after the suck-back is completed and the first liquid pipe valve VL1 is closed, the spare supply rod 29 is raised to close the spare supply port 31, and the spare supply rod 29 and the spare supply tube 28 are raised to the original position in the state in which the spare supply port 31 is closed, so that the headspace H is formed. Thus, in the present embodiment, the headspace forming step S5 forms the headspace H of a size corresponding to the combined volume of the liquid L discharged from the inside of the container C by the suck-back, and the total volume of the spare supply rod 29, the intra-tube channel 30 and the spare supply tube 28 that are withdrawn from the liquid L inside the container C. When the spare supply rod 29 and the spare supply tube 28 are raised to the original position, the gas discharge passage 37 is in the pressurizing state. The present disclosure is, however, not limited to this, and gas discharge passage 37 can also be in the exposed-to-atmosphere state or the closed state.

Figure 10:
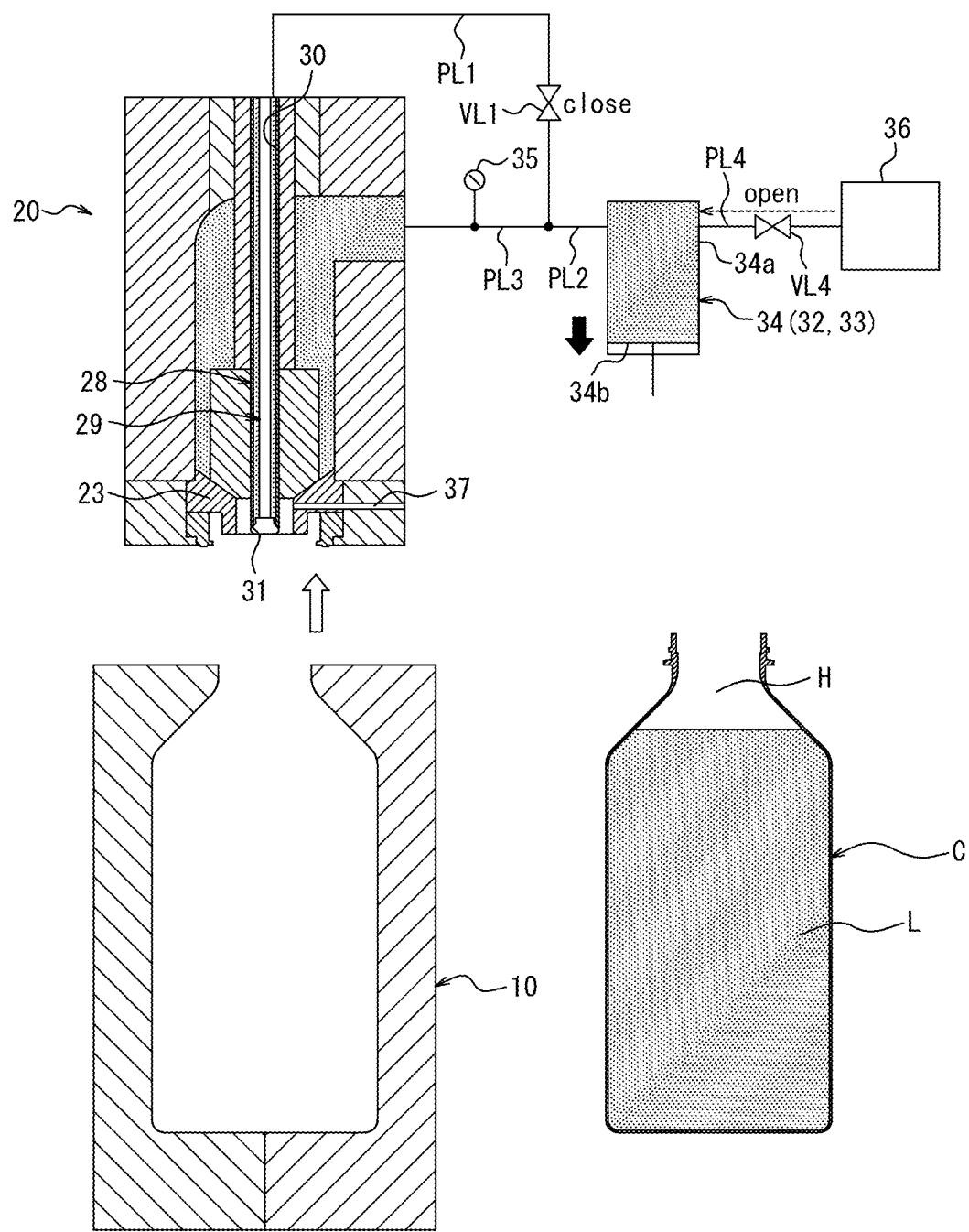
FIG. 10 illustrates the liquid-filled container manufacturing apparatus in a state in which a nozzle raising step is performed.

In the present embodiment, when the headspace forming step S5 is completed, the nozzle raising step S6 is performed. In the nozzle raising step S6, the gas discharge passage 37 is brought into the drawing state to prevent liquid dripping from the blow nozzle 23, and the nozzle unit 20 is raised as illustrated in FIG. 10. At this time, the raising of the nozzle unit 20 is preferably timed so as not to excessively depressurize the inside of the container C. The gas discharge passage 37 may be brought into the drawing state after the nozzle unit 20 is raised. After that, the fourth liquid pipe valve VL4 is opened, and the plunger 34b of pump 34 is operated in the drawing direction to fill the pressurized liquid supply source 33 (refer to the dashed arrow in FIG. 10). The container C is then removed from the mold 10, and the processing moves to the standby step S1 illustrated in FIG. 1.

The present disclosure is not limited to the above embodiment, and various changes may be made without departing from the gist of the present disclosure.

The liquid-filled container manufacturing method according to the embodiment can therefore be modified in various ways, for example, as described below.

The liquid-filled container manufacturing method according to the embodiment can be modified in various ways, as long as it includes the air discharge step S2 of discharging air from the inside of the preform 2, by supplying the liquid L at a level of pressure that does not cause stretching of the preform 2 to the inside of the preform 2 through the intra-tube channel 30 formed between the inner peripheral surface of the spare supply tube 28 extending through the blow nozzle 23 and the outer peripheral surface of the spare supply rod 29 provided radially inward thereof, and the liquid blow molding step S3 of molding the preform 2 into the container C with a shape conforming to the inner surface of the mold 10, by stretching the preform 2 downward using the spare supply rod 29 and supplying the pressurized liquid L to the inside of the preform 2 through the intra-nozzle channel formed between the inner peripheral surface 23d of the blow nozzle 23 and the outer peripheral surface of the spare supply rod 29.

For example, the liquid-filled container manufacturing method according to the embodiment does not need to include the depressurization step S4. Furthermore, in the liquid-filled container manufacturing method according to the embodiment, in the headspace forming step S5, the size of the headspace H may be adjusted, by adjusting the degree to which the spare supply tube 28 is inserted into the container C. Moreover, in the liquid-filled container manufacturing method according to the embodiment, in the headspace forming step S5, it is possible to form the headspace H corresponding to the volume of the spare supply tube 28 and the spare supply rod 29 being inserted, without operating the pump 34.

In the liquid-filled container manufacturing method according to the embodiment, in the air discharge step S2, it is preferable to gradually move the spare supply tube 28 upward relative to the spare supply rod 29, while supplying the liquid L to the inside of the preform 2 through the intra-tube channel 30.

Moreover, the liquid-filled container manufacturing method according to the embodiment preferably includes the headspace forming step S5 of forming the headspace H inside the container C, and in the headspace forming step S5, it is preferable to move the spare supply tube 28 downward relative to the spare supply rod 29 and subsequently discharge the liquid L from the inside of the container C through the intra-tube channel 30.

REFERENCE SIGNS LIST

1 Liquid-filled container manufacturing apparatus
2 Preform
2a Mouth
2b Body
2c Bottom
10 Mold
11 Cavity
20 Nozzle unit
20a Nozzle unit main body
21 Main body block
22 Support block
23 Blow Nozzle
23a Liquid supply port
23b Seal surface
23c Gas discharge port
23d Inner peripheral surface
24 Longitudinal channel (liquid supply passage)
25 Liquid supply port (liquid supply passage)
26 Seal Body
26a Seal main body
26b Shaft body
27 Tapered surface
28 Spare supply tube
29 Spare supply rod
29a Large-diameter portion
30 Intra-tube channel (spare supply path)
31 Spare supply port
32 Liquid drawing source
33 Pressurized liquid supply source
34 Pump
34a Cylinder
34b Piston
35 Third liquid pipe pressure gauge
36 Tank 37 Gas discharge passage
C Container
Ca Mouth
Cc Bottom
L Liquid (content liquid)
PL1 First liquid pipe (spare supply path)
PL2 Second liquid pipe (spare supply path, liquid supply passage)
PL3 Third liquid pipe (liquid supply passage)
PL4 Fourth liquid pipe
VL1 First liquid pipe valve
VL4 Fourth liquid pipe valve
H Headspace

The invention claimed is:

1. A liquid-filled container manufacturing method comprising:
   the air discharge step of discharging air from an inside of a preform, by supplying a liquid at a level of pressure that does not cause stretching of the preform to the inside of the preform through an intra-tube channel formed between an inner peripheral surface of a spare supply tube extending through a blow nozzle and an outer peripheral surface of a spare supply rod provided radially inward thereof; and
   the liquid blow molding step of molding the preform into a container with a shape conforming to an inner surface of a mold, by stretching the preform downward using the spare supply rod, and supplying a pressurized liquid to the inside of the preform through an intra-nozzle channel formed between an inner peripheral surface of the blow nozzle and the outer peripheral surface of the spare supply rod, with the spare supply tube being raised so that a lower end of the spare supply tube is positioned above the inner peripheral surface of the blow nozzle.

2. The liquid-filled container manufacturing method according to claim 1, wherein, in the air discharge step, the spare supply tube is gradually moved upward relative to the spare supply rod, while the liquid is supplied to the inside of the preform through the intra-tube channel.

3. The liquid-filled container manufacturing method according to claim 2, comprising
   the headspace forming step of forming a headspace inside the container, wherein
   in the headspace forming step, the spare supply tube is moved downward relative to the spare supply rod, and subsequently the liquid is discharged from an inside of the container through the intra-tube channel.

4. The liquid-filled container manufacturing method according to claim 1, comprising
   the headspace forming step of forming a headspace inside the container, wherein
   in the headspace forming step, the spare supply tube is moved downward relative to the spare supply rod, and subsequently the liquid is discharged from an inside of the container through the intra-tube channel.

* * * * *